United States Patent
Park et al.

(10) Patent No.: US 9,583,790 B2
(45) Date of Patent: Feb. 28, 2017

(54) ELECTROLYTE FOR LITHIUM BATTERY AND LITHIUM BATTERY INCLUDING THE SAME

(71) Applicant: Samsung Electronics Co., Ltd., Suwon-si, Gyeonggi-do (KR)

(72) Inventors: Insun Park, Hwaseong-si (KR); Yoonsok Kang, Seongnam-si (KR); Minsik Park, Hwaseong-si (KR); Jinhwan Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 131 days.

(21) Appl. No.: 14/537,165

(22) Filed: Nov. 10, 2014

(65) Prior Publication Data
US 2015/0147662 A1    May 28, 2015

(30) Foreign Application Priority Data
Nov. 22, 2013    (KR) .................. 10-2013-0143247

(51) Int. Cl.
*H01M 10/052* (2010.01)
*H01M 4/133* (2010.01)
(Continued)

(52) U.S. Cl.
CPC ....... *H01M 10/0567* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS 5,626,981 A   5/1997  Simon et al.
5,846,673 A   12/1998 Saidi et al.
(Continued)

FOREIGN PATENT DOCUMENTS

CN    102659686 A    9/2012
JP    09-306544 A    11/1997
(Continued)

OTHER PUBLICATIONS

Benfatti et al., "Synthesis of Ethyl 5-Hydroxyisoxazolidine-4-carboxylates via Michael Addition/Intramolecular Hemiketalisation", Eur. J. Org. Chem., 2008, pp. 6119-6127.
(Continued)

*Primary Examiner* — Patrick Ryan
*Assistant Examiner* — Christopher Domone
(74) *Attorney, Agent, or Firm* — Cantor Colburn LLP

(57) ABSTRACT

An electrolyte for a lithium battery, the electrolyte including a compound represented by Formula 1; a nonaqueous organic solvent; and a lithium salt.

Formula 1
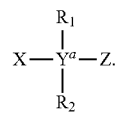

wherein, in Formula 1, X, $Y^a$, Z, $R_1$, and $R_2$ are as defined.

18 Claims, 6 Drawing Sheets

(51) Int. Cl.
*H01M 10/0567* (2010.01)
*H01M 4/131* (2010.01)
*H01M 10/0568* (2010.01)
*H01M 10/0569* (2010.01)

(52) U.S. Cl.
CPC ..... *H01M 10/052* (2013.01); *H01M 10/0568* (2013.01); *H01M 10/0569* (2013.01); *H01M 2300/0034* (2013.01); *H01M 2300/0037* (2013.01); *Y02E 60/122* (2013.01)

(56) References Cited

U.S. PATENT DOCUMENTS

| | | | |
|---|---|---|---|
| 6,077,628 | A | 6/2000 | Takechi et al. |
| 6,235,431 | B1 | 5/2001 | Takechi et al. |
| 6,677,082 | B2 | 1/2004 | Thackeray et al. |
| 6,680,143 | B2 | 1/2004 | Thackeray et al. |
| 7,205,072 | B2 | 4/2007 | Kang et al. |
| 7,303,840 | B2 | 12/2007 | Thackeray et al. |
| 7,705,535 | B2 | 4/2010 | Yamada |
| 8,076,031 | B1 | 12/2011 | West et al. |
| 2009/0087746 | A1 | 4/2009 | Kang et al. |
| 2012/0082890 | A1* | 4/2012 | Dong .......... H01M 6/164 429/188 |
| 2012/0121990 | A1 | 5/2012 | Kang et al. |
| 2012/0328939 | A1* | 12/2012 | Bhat .......... H01M 10/052 429/200 |
| 2014/0193714 | A1 | 7/2014 | Kim et al. |

FOREIGN PATENT DOCUMENTS

| | | |
|---|---|---|
| JP | 2001-266879 A | 9/2001 |
| JP | 2008-140767 A | 6/2008 |
| JP | 2010-086681 A | 4/2010 |
| JP | 2012-195134 A | 10/2012 |
| JP | 2013-056829 A | 3/2013 |
| KR | 10-2006-0097665 A | 9/2006 |
| KR | 10-0854540 B1 | 8/2008 |
| KR | 1020080110160 A | 12/2008 |
| KR | 1020090093165 A | 9/2009 |
| KR | 10-0943193 B1 | 2/2010 |
| KR | 1020100065349 A | 6/2010 |
| KR | 10-1002653 B1 | 12/2010 |
| KR | 10-2012-0052643 A | 5/2012 |
| KR | 10-1206037 B1 | 11/2012 |
| KR | 10-1270175 B1 | 5/2013 |
| KR | 1020130055441 A | 5/2013 |
| KR | 10-1288973 B1 | 7/2013 |
| KR | 10-2014-0089851 A | 7/2014 |
| WO | 2011/157958 A1 | 12/2011 |

OTHER PUBLICATIONS

Chen et al., "Role of surface coating on cathode materials for lithium-ion batteries", Journal of Materials chemistry, vol. 20, 2010, pp. 7606-7612.

Sheng Shui Zhang, "A review on electrolyte additives for lithium-ion batteries", Journal of Power sources, 162, 2006, pp. 1379-1394.

Markovsky et al., "On the influence of additives in electolyte solutions on the electrochemical behavior of carbon/ LiCoO2 cells at elevated temperatures", Journal of Power Sources, 136, 2004, pp. 296-302.

\* cited by examiner

HF removal

PF$_5$ stabilization

# US 9,583,790 B2

ELECTROLYTE FOR LITHIUM BATTERY AND LITHIUM BATTERY INCLUDING THE SAME

CROSS-REFERENCE TO RELATED APPLICATIONS

This application claims priority to Korean Patent Application No. 10-2013-0143247, filed on Nov. 22, 2013, in the Korean Intellectual Property Office, and all the benefits accruing therefrom under 35 U.S.C. §119, the content of which is incorporated herein in its entirety by reference.

BACKGROUND

1. Field

The present disclosure relates to an electrolyte for a lithium battery, and a lithium battery including the electrolyte.

2. Description of the Related Art

Recently, lithium batteries have drawn significant attention as power sources for small portable electronic devices. Lithium batteries using an organic electrolyte have greater energy density and a discharge voltage about twice that of batteries using an aqueous alkali electrolyte.

In lithium batteries, lithium-transition metal oxides, such as $LiCoO_2$, $LiMn_2O_4$, $LiNi_{1-x}Co_xO_2$ (where $0<x<1$), which have a structure that allows intercalation of lithium ions, are mainly used as cathode active materials. Various forms of carbonaceous materials, such as artificial graphite, natural graphite, and hard carbon, which allow intercalation and deintercalation of lithium ions, have been used as anode active materials.

As lithium batteries are increasingly used in high-temperature environments, there has been an increasing need to improve the stability of the lithium batteries. A common way to improve the safety of lithium batteries is by using a flame-resistant electrolyte. However, the use of the flame-resistant electrolyte may lower the output power and lifetime of the lithium battery while increasing its operating time. Therefore, there remains a need for an improved electrolyte.

SUMMARY

Provided is a novel electrolyte for a lithium battery, and a lithium battery that includes the electrolyte, which provides improved stability, improved power output, and improved lifetime characteristics.

Additional aspects will be set forth in part in the description which follows and, in part, will be apparent from the description.

According to an aspect, an electrolyte for a lithium battery includes: a compound represented by Formula 1; a nonaqueous organic solvent, and a lithium salt:

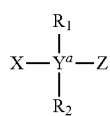

Formula 1 wherein, in Formula 1,
X is hydrogen or a C1-C30 alkyl group,
$Y^a$ is silicon (Si) or germanium (Ge),
Z is O—N(R)—$Z_1$, —O-M, or —O—Si($R_3$)($R_4$)—$Z_2$, where M is an alkali metal, R is hydrogen, lithium, a C1-C30 alkyl group, a C4-C30 carbocyclic group, or a C5-C30 carbocyclic alkyl group, and $Z_1$ and $Z_2$ are each independently hydrogen, a C1-C30 alkyl group, a C4-C30 carbocyclic group, a C5-C30 carbocyclic alkyl group, —Si($R_5$)($R_6$)($R_7$), or —O—Si($R_5$)($R_6$)($R_7$), and $R_1$ to $R_7$ are each independently hydrogen, a C1-C30 alkyl group, a C1-C30 alkoxy group, a C6-C30 aryl group, a C6-C30 aryloxy group, a C7-C30 arylalkyl group, a C2-C30 heteroaryl group, a C2-C30 heteroaryloxy group, a C3-C30 heteroarylalkyl group, a C4-C30 carbocyclic group, a C5-C30 carbocyclic alkyl group, a C2-C30 heterocyclic group, a C3-C30 heterocyclic alkyl group, a halogen atom, a hydroxy group, a cyano group, or an amino group.

According to another aspect, a lithium battery includes:
a cathode;
an anode;
the electrolyte and
a reaction product of the electrolyte.

Also disclosed is a method of manufacturing an electrolyte, the method including contacting a compound represented by Formula 1, a nonaqueous organic solvent, and a lithium salt to manufacture the electrolyte:

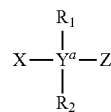

Formula 1 wherein, in Formula 1,
X is hydrogen or a C1-C30 alkyl group,
$Y^a$ is Si or Ge,
Z is —O—N(R)—$Z_1$, —O-M, or —O—Si($R_3$)($R_4$)—$Z_2$, where M is an alkali metal, R is hydrogen, lithium, a C1-C30 alkyl group, a C4-C30 carbocyclic group, or a C5-C30 carbocyclic alkyl group, and $Z_1$ and $Z_2$ are each independently hydrogen, a C1-C30 alkyl group, a C4-C30 carbocyclic group, a C5-C30 carbocyclic alkyl group, —Si($R_5$)($R_6$)($R_7$), or —O—Si($R_5$)($R_6$)($R_7$), and $R_1$ to $R_7$ are each independently hydrogen, a C1-C30 alkyl group, a C1-C30 alkoxy group, a C6-C30 aryl group, a C6-C30 aryloxy group, a C7-C30 arylalkyl group, a C2-C30 heteroaryl group, a C2-C30 heteroaryloxy group, a C3-C30 heteroarylalkyl group, a C4-C30 carbocyclic group, a C5-C30 carbocyclic alkyl group, a C2-C30 heterocyclic group, a C3-C30 heterocyclic alkyl group, a halogen atom, a hydroxy group, a cyano group, or an amino group.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
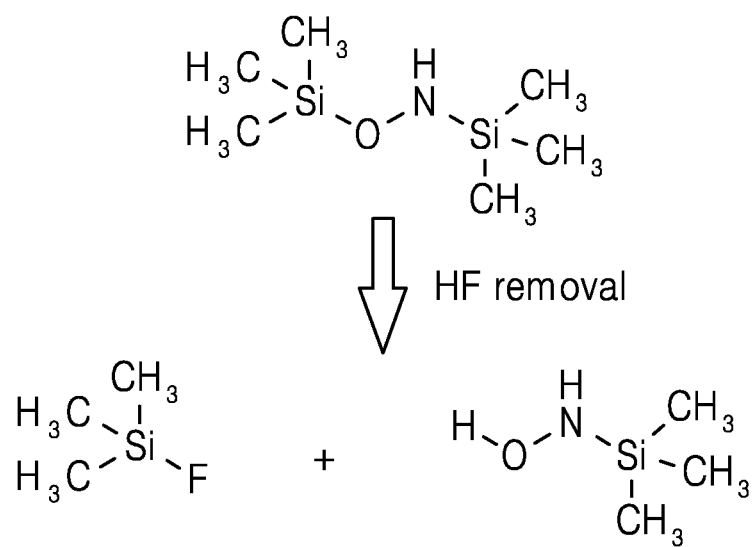
FIGS. 1A and 1B illustrate an embodiment of an operational principle of an embodiment of an electrolyte for a lithium battery.

Reference will now be made in detail to embodiments of an electrolyte for lithium batteries, and a lithium battery including the electrolyte, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Lithium hexafluorophosphate ($LiPF_6$) is widely used as a lithium salt for lithium batteries because it provides better ion conductivity, ion mobility, thermal stability, and electrochemical stability than other lithium salts, such as lithium perchlorate ($LiClO_4$), lithium tetrafluoroborate ($LiBF_4$), lithium tetrafluoro arsenate ($LiAsF_6$), and lithium bis(trifluoromethansulfonyl)imide ("LiTFSI").

However, lithium hexafluorophosphate (LiPF$_6$) is chemically unstable and is prone to decomposition by hydrolysis when moisture or acidic impurities are present in the lithium salt and a solvent (refer to Reaction Schemes 1 and 2).

$$\text{LiPF}_6 + \text{H}_2\text{O} \rightarrow 2\text{HF} + \text{LiF} + \text{POF}_3 \qquad \text{Reaction Scheme 1}$$

$$\text{PF}_5 + \text{H}_2\text{O} \rightarrow 2\text{HF} + \text{POF}_3 \qquad \text{Reaction Scheme 2}$$

When an electrolyte includes a strong Lewis acid such as PF$_5$ or a strong acid such as HF, the acid components may corrode a solid electrolyte interface ("SEI") through a reaction with components of the solvent and electrode active components in a lithium battery, thus lowering the lifetime characteristics of the lithium battery.

To address these drawbacks, and while not wanting to be bound by theory, it is understood that generation of HF may be suppressed by stabilizing PF$_5$ as in Reaction Scheme 2 or by removing H$_2$O in Reaction Schemes 1 and 2. Generation of HF may also be suppressed by removing the HF generated in Reaction Schemes 1 and 2.

Disclosed is an electrolyte for a lithium battery that includes a compound represented by Formula 1, a nonaqueous organic solvent, and a lithium salt to suppress the generation of HF and/or to remove HF.

Formula 1

$$X-\underset{\underset{R_2}{|}}{\overset{\overset{R_1}{|}}{Y^a}}-Z$$

In Formula 1,
X may be hydrogen or a C1-C30 alkyl group,
Y$^a$ may be silicon (Si) or germanium (Ge),
Z may be O—N(R)—Z$_1$, —O-M, or —O—Si(R$_3$)(R$_4$)—Z$_2$, wherein M may be an alkali metal, R may be hydrogen, lithium, a C1-C30 alkyl group, a C4-C30 carbocyclic group, or a C5-C30 carbocyclic alkyl group, and Z$_1$ and Z$_2$ may be each independently hydrogen, a C1-C30 alkyl group, a C4-C30 carbocyclic group, a C5-C30 carbocyclic alkyl group, —Si(R$_5$)(R$_6$)(R$_7$), or —O—Si(R$_5$)(R$_6$)(R$_7$), and R$_1$ to R$_7$ may be each independently hydrogen, a C1-C30 alkyl group, a C1-C30 alkoxy group, a C6-C30 aryl group, a C6-C30 aryloxy group, a C7-C30 arylalkyl group, a C2-C30 heteroaryl group, a C2-C30 heteroaryloxy group, a C3-C30 heteroarylalkyl group, a C4-C30 carbocyclic group, a C5-C30 carbocyclic alkyl group, a C2-C30 heterocyclic group, a C3-C30 heterocyclic alkyl group, a halogen atom, a hydroxy group, a cyano group, or an amino group.

While not wanting to be bound by theory, it is understood that when the compound of Formula 1 is included in the electrolyte, a decomposition reaction may be induced on a surface of an anode to form a stable solid electrolyte interface ("SEI") on an interface between the anode and the electrolyte, and thus may improve the stability of the lithium battery.

In Formula 1, R$_3$ and R$_4$ may be each independently a C1-C10 alkyl group, for example, a methyl group or an ethyl group.

In Formula 1, R$_5$, R$_6$, and R$_7$ may be each independently, hydrogen or a C1-C10 alkyl group, for example, hydrogen, a methyl group, or an ethyl group.

In Formula 1, —Si(R$_5$)(R$_6$)(R$_7$) for Z$_1$ or Z$_2$ may be —Si(CH$_3$)$_3$, and —O—Si(R$_5$)(R$_6$)(R$_7$) for Z$_1$ or Z$_2$ may be —OSiH(CH$_3$)$_2$.

In some embodiments, the compound represented by Formula 1 may be a compound represented by Formula 2.

Formula 2

$$R_9-\underset{\underset{R_{10}}{|}}{\overset{\overset{R_8}{|}}{Si}}-O-L-\underset{\underset{R_{13}}{|}}{\overset{\overset{R_{11}}{|}}{Si}}-R_{12}$$

In Formula 2,
L may be —N(H)— or —Si(R$_3$)(R$_4$)—O—, and
R$_3$, R$_4$, and R$_8$ to R$_{13}$ may be each independently a C1-C30 alkyl group or a C6-C30 aryl group, wherein R$_9$ and R$_{12}$ may be hydrogen when L is —Si(R$_3$)(R$_4$)—O—.

In some other embodiments, the compound represented by Formula 1 may be a compound represented by Formula 3.

Formula 3

$$R_{15}-\underset{\underset{R_{16}}{|}}{\overset{\overset{R_{14}}{|}}{Si}}-O-M$$

In Formula 3,
R$_{14}$ to R$_{16}$ may be each independently a C1-C30 alkyl group or a C6-C30 aryl group, and
M may be lithium (Li), sodium (Na), or potassium (K).

In some other embodiments, the compound represented by Formula 1 may be a compound represented by Formula 4, a compound represented by Formula 5, or a compound represented by Formula 6.

Formula 4

$$\text{H}_3\text{C}\underset{\underset{\text{H}_3\text{C}}{|}}{\overset{\overset{\text{CH}_3}{|}}{\text{Si}}}-\text{O}-\underset{\text{H}}{\text{N}}-\underset{\underset{\text{CH}_3}{|}}{\overset{\overset{\text{CH}_3}{|}}{\text{Si}}}-\text{CH}_3$$

Formula 5

$$\text{H}_3\text{C}-\underset{\underset{\text{CH}_3}{|}}{\overset{\overset{\text{H}}{|}}{\text{Si}}}-\text{O}-\underset{\underset{\text{CH}_3}{|}}{\overset{\overset{\text{CH}_3}{|}}{\text{Si}}}-\text{O}-\underset{\underset{\text{CH}_3}{|}}{\overset{\overset{\text{CH}_3}{|}}{\text{Si}}}-\text{H}$$

Formula 6

$$\text{LiO}-\underset{\underset{\text{CH}_3}{|}}{\overset{\overset{\text{CH}_3}{|}}{\text{Si}}}-\text{CH}_3$$

Figure 1B:
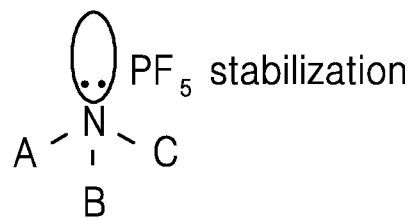

FIGS. 1A and 1B illustrate an embodiment of an operational principle of an electrolyte for a lithium battery. The operational principle of the electrolyte will be described in greater detail with reference to a compound of Formula 4 as an example of the compound of Formula 1.

The compound of Formula 4 may remove HF in the electrolyte via a reaction with HF as illustrated in FIG. 1A. The compound of Formula 4 may also suppress generation of HF and stabilize PF$_5$ by coordinating to PF$_5$ via an unshared electron pair of nitrogen in the compound of Formula 4, as illustrated in FIG. 1B.

In FIGS. 1B, A, B, and C indicate groups bound to nitrogen (N).

The compound of Formula 5 and the compound of Formula 6 are understood to act the same way as the compound of Formula 4.

An amount of the compound of Formula 1 in the electrolyte of a lithium battery may be in a range of about 0.005 weight percent (wt %) to about 10 wt %, and in some embodiments, in a range of about 0.1 wt % to about 2 wt %, each range based on a total weight of the electrolyte. When the amount of the compound of Formula 1 is within these ranges, the lithium battery may have improved lifetime characteristics with improved high-rate characteristics and improved discharge voltage characteristics.

In Formula 1, the C6-C30 aryl group may be, for example, a phenyl group, and the C1-C30 alkyl group may be, for example, a methyl group, an ethyl group, a propyl group, a pentyl group, or a hexyl group.

In some embodiments, the lithium salt of the electrolyte may be a lithium salt capable of generating HF, for example, $LiPF_6$. Non-limiting examples of the lithium salt of the electrolyte are $LiBF_4$, $LiAsF_6$, $LiCF_3SO_3$, $Li(CF_3SO_2)_2N$, $LiC_4F_9SO_3$, and $Li(OF_3SO_2)_3C$.

The lithium salt of the electrolyte may further include, in addition to any of the above-described lithium salts capable of generating HF, at least one selected from $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, and $LiB(C_2O_4)_2$(lithium bis(oxalato)borate, LiBOB).

A concentration of the lithium salt may be in a range of about 0.1 molar (M), i.e., 0.1 moles per liter, to about 2.0 M. When the concentration of the lithium salt is within this range, the electrolyte may have improved performance with an appropriate conductivity and an appropriate viscosity, and may effectively migrate lithium ions.

The nonaqueous organic solvent of the electrolyte may serve as a medium for migration of ions involved in electrochemical reactions in batteries.

The nonaqueous organic solvent may be at least one selected from a carbonate solvent, an ester solvent, an ether solvent, a ketone solvent, and an alcohol solvent. An aprotic nonaqueous organic solvent is specifically mentioned.

Non-limiting examples of the carbonate solvent are dimethyl carbonate ("DMC"), diethyl carbonate ("DEC"), dipropyl carbonate ("DPC"), methyl propyl carbonate ("MPC"), ethyl propyl carbonate ("EPC"), methyl ethyl carbonate ("MEC"), ethylene carbonate ("EC"), propylene carbonate ("PC"), and butylene carbonate ("BC"). Non-limiting examples of the ester solvent are methyl acetate, ethyl acetate, n-propyl acetate, dimethyl acetate, methyl propionate, ethyl propionate, γ-butyrolactone, decanolide, valerolactone, mevalonolactone, and caprolactone.

Non-limiting examples of the ether solvent are dibutyl ether, tetraglyme, diglyme, dimethoxyethane, 2-methyltetrahydrofuran, and tetrahydrofuran. Non-limiting examples of the ketone solvent may be methyl ethyl ketone, methyl propyl ketone, cyclopentanone, and cyclohexanone. Non-limiting examples of the alcohol solvent are ethyl alcohol and isopropyl alcohol. Non-limiting examples of the aprotic solvent are nitriles, such as compounds of the formula R—CN (wherein R is a straight, branched or cyclic C2-C20 hydrocarbon group, which may have a double-bonded aromatic ring or an ether bond); amides, such as dimethylformamide; dioxolanes, such as 1,3-dioxolane; and sulfolanes. As used herein, the term "aprotic solvent" refers to a solvent which cannot donate hydrogen to form a hydrogen bond.

These nonaqueous organic solvents may be used alone or in combination of at least one thereof. A mixing ratio of the nonaqueous organic solvents may be appropriately varied depending on the desired performance of a battery, and will be apparent to one of ordinary skill in the art.

The carbonate solvent may be a combination of cyclic carbonate and acyclic carbonate. As used herein, the term "cyclic carbonate" refers to a carbonate compound having at least one ring and in which a carbonate group (—O(C=O)O—) forms a part of the ring. Also, as used herein, the term "acyclic carbonate" refers to a carbonate compound wherein a carbonate group (—O(C=O)O—) does not form a part of the ring. The acyclic carbonate may include a linear hydrocarbon chain, a branched hydrocarbon chains, or both. For example, a combination of cyclic carbonate and acyclic carbonate in a volume ratio of about 1:9 to about 9:1, and in some embodiments, about 3:7 to about 7:3, may be used to attain a high-performance electrolyte. Using a mixed solvent of cyclic carbonate and acyclic carbonate in an appropriate ratio may increase an ionic conductivity of the electrolyte, due to a high dielectric constant of the cyclic carbonate and a low viscosity of the acyclic carbonate.

The nonaqueous organic solvent may further include an aromatic hydrocarbon organic solvent in addition to a carbonate. In this regard, the carbonate solvent and the aromatic hydrocarbon organic solvent may be combined, for example, in a volume ratio of about 1:1 to about 30:1, for example, in a volume ratio of about 5:1 to about 20:1, and for example, in a volume ratio of 10:1 to 15:1.

An example of the aromatic hydrocarbon organic solvent is an aromatic hydrocarbon compound represented by Formula 9:

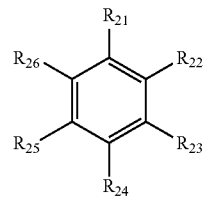

Formula 9

In Formula 9, $R_{21}$ to $R_{26}$ may be each independently hydrogen, a halogen atom, a C1-C10 alkyl group, a C1-C10 haloalkyl group, or a combination thereof.

Non-limiting examples of the aromatic hydrocarbon organic solvent are benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The nonaqueous organic solvent may further include a vinylene carbonate or an ethylene carbonate compound represented by Formula 10, to improve the lifetime characteristics of the lithium battery.

Formula 10

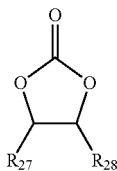

In Formula 10, $R_{27}$ and $R_{28}$ may be each independently hydrogen, a C1-C30 alkyl group, a C4-C30 carbocyclic group, a C5-C30 carbocyclic alkyl group, a halogen atom (for example, fluorine), a cyano group (—CN), a nitro group (—NO$_2$), an ester group (—C(=O)OR, wherein R is a C1-C30 alkyl group, a C4-C30 carbocyclic group, a C5-C30 carbocyclic alkyl group), or a C105 fluoroalkyl group, and at least one of $R_7$ and $R_8$ may be a halogen atom, a cyano group (—CN), a nitro group (—NO$_2$), or a C105 fluoroalkyl group.

Non-limiting examples of the ethylene carbonate compound are difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. When the nonaqueous organic solvent further includes a vinylene carbonate or an ethylene carbonate compound as described above, an amount of the vinylene carbonate or ethylene carbonate compound may be appropriately adjusted to improve the lifetime characteristics of the lithium battery.

For example, the nonaqueous organic solvent may be at least one selected from dimethyl carbonate ("DMC"), diethyl carbonate ("DEC"), dipropyl carbonate ("DPC"), methyl propyl carbonate ("MPC"), ethyl propyl carbonate ("EPC"), methyl ethyl carbonate ("MEC"), ethylene carbonate ("EC"), propylene carbonate (PC), butylene carbonate ("BC"), fluoroethylene carbonate ("FEC"), vinylene carbonate ("VC"), acetonitrile, succinonitrile ("SN"), dimethyl sulfoxide, dimethyl formamide, dimethyl acetamide, γ-butyrolactone, tetrahydrofuran.

The nonaqueous organic solvent may be, for example, a mixed solvent of fluoroethylene carbonate and dimethyl carbonate, for example, in a ratio of about 1:9 to about 9:1 by volume, and in some embodiments, in a ratio of about 3:7 to about 7:3 by volume.

According to another embodiment of the present disclosure, a lithium battery includes
a cathode,
an anode,
the electrolyte disclosed above, and
a reaction product of the electrolyte.

The lithium battery may be manufactured by any of a variety of methods known in the art. The electrolyte of the lithium battery may include a lithium salt, a nonaqueous organic solvent, and a compound represented by Formula 1. The compound represented by Formula 1, the nonaqueous organic solvent, and the lithium salt of the lithium battery may be the same as described above with reference to the electrolyte, and thus, will not be described here in further detail. The electrolyte may be manufactured by contacting the compound represented by Formula 1, a nonaqueous organic solvent, and a lithium salt to manufacture the electrolyte.

A solid electrolyte interphase ("SEI") may be disposed between the anode and the electrolyte. The SEI may be partially or fully derived from the compound of Formula 1 in the electrolyte.

Since the compound represented by Formula 1 in the electrolyte of the lithium battery may form the SEI on a surface of the anode, an amount of the compound of Formula 1 in the electrolyte may be reduced after operation of the lithium battery.

For example, the amount of the compound of Formula 1 after the operation of the lithium battery may be lower than the amount of the compound of Formula 1 before the operation of the lithium battery.

In any of the lithium batteries according to the above-described embodiments, the electrolyte including the compound represented by Formula 1 may prevent release of a transition metal out of an electrode active material and reduce the amount of HF that may damage the SEI, and thus improving the lifetime characteristics of the lithium battery. As a result of the suppressed damage of the SEI, resistance in the SEI may be reduced with repeated charging and discharging cycles, so that the lithium battery may have improved high-rate characteristics and improved discharge voltage retention characteristics. Since the compound represented by Formula 1 may be used in a mixture with the electrolyte, it may be practically simple to use the compound of Formula 1 in a manufacturing process of a lithium battery.

In any of the lithium batteries according to the above-described embodiments, the SEI may be formed on a surface of the anode as a result of oxidation of a part or the whole amount of the compound of Formula 1 during initial charging of the lithium battery. As a result, the lithium battery may have improved capacity retention characteristics, improved lifetime characteristics, and improved high-rate characteristics, when operated at a voltage of about 4.0 volts (V) to about 5.5 V or even when charged with a high voltage.

A thickness of the SEI on the surface of the anode of the lithium battery may be in a range of about 0.05 nanometers (nm) to about 100 nm. For example, the thickness of the SEI may be in a range of about 0.1 nm to about 80 nm, and in some embodiments, in a range of about 0.5 nm to about 50 nm. When the thickness of the SEI on the anode is within these ranges, the SEI may not adversely affect the transfer of lithium ions and may effectively prevent oxidation of the electrolyte on the surface of the anode.

The anode of the lithium battery may include an anode active material. The anode active material may be a material that allows reversible intercalation and deintercalation of lithium ions, lithium metal, a lithium metal alloy, a material that allows doping or undoping of lithium, or a transition metal oxide.

The cathode of the lithium battery may include a cathode active material, for example, a material that allows reversible intercalation and deintercalation of lithium. In some embodiments, the cathode active material may be $Li_{1+x}Mn_wCo_yNi_zO_2$ (wherein w+x+y+z=1, 0.05≤x≤0.2, 0.05≤w<1, 0.05≤y<1, and 0.05≤z<1).

Hereinafter, a method of manufacturing a lithium battery using any of the electrolytes according to the above-described embodiments will be described, according to an embodiment of the present disclosure in which the lithium battery may include a cathode, an anode, the electrolyte including the compound of Formula 1, and a separator.

The cathode and the anode may be manufactured by respectively coating a cathode active material layer composition and an anode active material layer composition on current collectors and drying the resulting products.

The composition for forming a cathode active material layer may be prepared by mixing a cathode active material, a conducting agent, a binder, and a solvent together.

A compound (a lithiated intercalation compound) which allows reversible intercalation and deintercalation of lithium may be used as the cathode active material.

Any lithium-containing metal oxide that is commonly used in the art may be used as the cathode active material. For example, the common cathode active material may be at least one of a composite oxide of lithium with a metal selected from among Co, Mn, Ni, and a combination thereof. For example, the common cathode active material may be a compound represented by at least one of $Li_aA_{1-b}M^g{}_bD_2$ (wherein $0.90 \leq a \leq 1$, and $0 \leq b \leq 0.5$); $Li_aE_{1-b}M^g{}_bO_{2-c}M^h{}_c$ (wherein $0.90 \leq a \leq 1$, $0 \leq b \leq 0.5$, and $0 \leq c \leq 0.05$); $LiE_{2-b}M^g{}_bO_{4-c}M^h{}_c$ (wherein $0 \leq b \leq 0.5$, and $0 \leq c \leq 0.05$); $Li_aNi_{1-b-c}Co_bM^g{}_cM^h{}_\alpha$ (wherein $0.90 \leq a \leq 1$, $0 \leq b \leq 0.5$, $0 \leq c \leq 0.05$, and $0<\alpha \leq 2$); $Li_aNi_{1-b-c}Co_bM^g{}_cO_{2-\alpha}X^a{}_\alpha$ (wherein $0.90 \leq a \leq 1$, $0 \leq b \leq 0.5$, $0 \leq c \leq 0.05$, and $0<\alpha<2$); $Li_aNi_{1-b-c}Co_bM^g{}_cO_{2-\alpha}X^a{}_2$ (wherein $0.90 \leq a \leq 1$, $0 \leq b \leq 0.5$, $0 \leq c \leq 0.05$, and $0<\alpha<2$); $Li_aNi_{1-b-c}Mn_bM^g{}_cM^h{}_\alpha$ (wherein $0.90 \leq a \leq 1$, $0 \leq b \leq 0.5$, $0 \leq c \leq 0.05$, and $0<\alpha \leq 2$); $Li_aNi_{1-b-c}Mn_bM^g{}_cO_{2-\alpha}X^a{}_\alpha$ (wherein $0.90 \leq a \leq 1$, $0 \leq b \leq 0.5$, $0 \leq c \leq 0.05$, and $0<\alpha<2$); $Li_aNi_{1-b-c}Mn_bM^g{}_cO_{2-\alpha}X^a{}_2$ (wherein $0.90 \leq a \leq 1$, $0 \leq b \leq 0.5$, $0 \leq c \leq 0.05$, and $0<\alpha<2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiM^iO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulas above,

A is at least one selected from nickel (Ni), cobalt (Co), and manganese (Mn);

$M^g$ is at least one selected from aluminum (Al), nickel (Ni), cobalt (Co), manganese (Mn), chromium (Cr), iron (Fe), magnesium (Mg), strontium (Sr), vanadium (V), and a rare earth element;

$M^h$ is at least one selected from oxygen (O), fluorine (F), sulfur (S), and phosphorus (P);

E is selected from cobalt (Co), and manganese (Mn);

$X^a$ is at least one selected from fluorine (F), sulfur (S), and phosphorus (P);

G is at least one selected from aluminum (Al), chromium (Cr), manganese (Mn), iron (Fe), magnesium (Mg), lanthanum (La), cerium (Ce), strontium (Sr), and vanadium (V);

Q is at least one selected from titanium (Ti), molybdenum (Mo), and manganese (Mn);

$M^i$ is at least one selected from chromium (Cr), vanadium (V), iron (Fe), scandium (Sc), and yttrium (Y); and J is at least one selected from vanadium (V), chromium (Cr), manganese (Mn), cobalt (Co), nickel (Ni), and copper (Cu).

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like. The selection of the appropriate coating method is apparent to those of skill in the art, and thus a detailed description thereof will be omitted here.

In some embodiments, the cathode active material may include at least one of $LiCoO_2$, $LiNi_{1-x}Co_xO_2$ ($0 \leq x<1$), $Li_{1-x}M^a{}_xO_2$ (wherein $M^a$ may be at least one of Mn and Fe, and $0.03<x<0.1$), $Li[Ni_xCo_{1-2x}Mn_x]O_2$ (wherein $0<x<0.5$), $Li[Ni_xMn_x]O_2$ (wherein $0<x \leq 0.5$), $Li_{1+x}(Ni, Co, Mn)_{1-y}O_z$ (wherein $0<x \leq 1$, $0 \leq y<1$, and $2 \leq z \leq 4$), $LiM^b{}_2O_4$ (wherein $M^b$ may be at least one of Ti, V, and Mn), $LiM^c{}_xMn_{2-x}O_4$ (wherein $M^c$ may be a transition metal, and $0 \leq x \leq 2$), $LiFePO_4$, $LiM^dPO_4$ (wherein $M^d$ may be at least one of Mn, Co, and Ni)), $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_8$, $Cu_xV_2O_5$, $Cr_xV_6O_{13}$, $M^e{}_2(XO_4)_3$ (wherein $M^e$ may be a transition metal, and X may be at least one of S, P, As, Mo, and W), and $Li_3M^f{}_2(PO_4)_3$ (wherein $M^f$ may be at least one of Fe, V, and Ti).

In some other embodiments, the cathode active material may be $Li_{1+x}Mn_wCo_yNi_zO_2$ (wherein $w+x+y+z=1$, $0.05 \leq x \leq 0.2$, $0.05 \leq w<1$, $0.05 \leq y<1$, and $0.05 \leq z<1$), for example, $Li_{1.17}Mn_{0.5}CO_{0.17}Ni_{0.17}O_2$.

The binder of the cathode active material layer may strongly bind cathode active material particles together or to a cathode current collector. For example, the binder may be at least one of polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

The amount of the binder may be from about 1 part to about 50 parts by weight, for example from about 1 part to about 30 parts by weight based on 100 parts by weight of the total weight of the cathode active material. When the amount of the binder is within this range, the cathode active material layer may be bound strongly to the current collector.

The conducting agent is not particularly limited, and may be any material as long as it has an appropriate conductivity without causing chemical changes in the lithium battery. Non-limiting examples of the conducting agent are graphite such as natural or artificial graphite; carbonaceous materials such as carbon black, acetylene black, ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and other conductive materials such as polyphenylene derivatives.

The amount of the conducting agent may be from about 2 parts to about 5 parts, for example, about 3.5 parts by weight based on 100 parts by weight of the total weight of the cathode active material. When the amount of the conducting agent is within this range, the anode may have better conductive characteristics.

Non-limiting examples of the solvent is acetonitrile, N-methylpyrrolidone ("NMP"), N,N-dimethylformamide ("DMF"), and dimethylsulfoxide ("DMSO").

The amount of the solvent may be from about 100 parts to about 2,000 parts by weight, for example, about 500 parts to about 1,000 parts by weight based on 100 parts by weight of the cathode active material. When the amount of the solvent is within this range, forming the cathode active material layer may be facilitated.

A cathode current collector may be fabricated to have a thickness of from about 3 micrometers (μm) to about 500 μm, and may be any current collector as long as it has high conductivity without causing chemical changes in the lithium battery. Examples of the cathode current collector are stainless steel, aluminum, nickel, titanium, thermally-treated carbon, and aluminum or stainless steel that is surface-treated with carbon, nickel, titanium, or silver. The cathode current collector may be processed to have fine irregularities on a surface thereof so as to enhance an adhesive strength of the current collector to the cathode active material layer. The cathode current collector may be in any of various forms, including a film, a sheet, a foil, a net, a porous structure, foam, and non-woven fabric.

A composition for forming an anode active material layer may be prepared using an anode active material, a binder, a conducting agent, and a solvent together.

The anode active material may be a material that allows intercalation and deintercalation of lithium ions. Non-limiting examples of the anode active material are any of a variety of anode active materials that are commonly used in the art. Non-limiting examples of the anode active material are a lithium metal, an alloy of a lithium metal, a transition metal oxide, a material that allows doping or undoping of lithium, and a material that allows reversible intercalation and deintercalation of lithium ions, which may be used as a mixture or in combination of at least two thereof.

The lithium metal alloy may be an alloy of lithium with a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

Non-limiting examples of the transition metal oxide are a tungsten oxide, a molybdenum oxide, a titanium oxide, a lithium titanium oxide, a vanadium oxide, and a lithium vanadium oxide.

Examples of the material that allows doping or undoping of lithium are Si, Sn, Al, Ge, Pb, Bi, Sb, a Si-$M^j$ alloy (wherein $M^j$ is an alkali metal, an alkali earth metal, a Group 11 element, a Group 12 element, a Group 13 element, a Group 14 element, a Group 15 element, a Group 16 element, a transition metal, a rare earth element, or a combination thereof, except for Si), and a Sn-$M^k$ alloy (wherein $M^k$ is an alkali metal, an alkali earth metal, a Group 11 element, a Group 12 element, a Group 13 element, a Group 14 element, a Group 15 element, a Group 16 element, a transition metal, a rare earth element, or a combination thereof, except for Sn). For example, $M^k$ may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

The material that allows reversible intercalation and deintercalation of lithium ions may be any carbonaceous anode active materials that are commonly used in a lithium ion battery. Examples of such carbonaceous materials are crystalline carbon, amorphous carbon, or mixtures thereof. Non-limiting examples of the crystalline carbon are natural graphite, artificial graphite, expanded graphite, graphene, fullerene soot, carbon nanotubes, and carbon fibers. Non-limiting examples of the amorphous carbon are soft carbon (carbon sintered at low temperatures), hard carbon, mesophase pitch carbides, and sintered corks. The carbonaceous anode active material may be in, for example, spherical, planar, fibrous, tubular, or powder form.

In some embodiments, the anode active material may include at least one of a vanadium oxide, a lithium vanadium oxide, silicon (Si), $SiO_x$ (wherein $0<x<2$), a Si-$M^l$ alloy (wherein $M^l$ is magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof), graphite, soft carbon, hard carbon, mesophase pitch carbide, and sintered coke.

The amounts and types of the binder and the conducting agent for the anode may be the same as those of the binder and the conducting agent for the cathode.

The amount of the solvent may be from about 100 parts to about 2,000 parts by weight, for example, about 500 parts to about 1,000 parts by weight based on 100 parts by weight of the anode active material. When the amount of the solvent is within this range, forming the anode active material layer may be facilitated. Types of the solvent that may be used for the anode active layer may be the same as those of the solvent for the cathode.

An anode current collector may be fabricated to have a thickness of about 3 μm to about 500 μm, for example about 10 μm to about 500 μm, and for example, 10 μm to about 100 μm. The anode current collector is not particularly limited, and may be any material as long as it has an appropriate conductivity and does not cause chemical changes in the fabricated battery. Non-limiting examples of the anode current collector are copper, stainless steel, aluminum, nickel, titanium, thermal-treated carbon, copper or stainless steel that is surface-treated with carbon, nickel, titanium or silver, and aluminum-cadmium alloys. In addition, similar to the cathode current collector, the anode current collector may be processed to have fine irregularities on a surface thereof so as to enhance the adhesive strength of the anode current collector to the anode active material, and may be used in any of various forms, including a film, a sheet, a foil, a net, a porous structure, foam, and non-woven fabric.

The separator is disposed between the cathode and anode manufactured according to the processes described above.

The separator may have a pore diameter of about 0.01 μm to about 10 μm, for example, about 0.1 μm to about 10 μm and a thickness of about 5 μm to about 20 μm, for example, about 10 μm to about 15 μm. Examples of the separator are olefin-containing polymers, such as polypropylene, having resistance to chemicals and hydrophobic properties, and sheets or non-woven fabric made of glass fiber or polyethylene. When a solid electrolyte, for example, a polymer electrolyte, is used, the solid electrolyte may also serve as the separator.

The separator may be a monolayer or a multilayer including at least two layers of olefin-containing polymer, for example, polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

A final concentration of a halogen acid, for example, HF, in the lithium battery may be about 200 parts per million (ppm) or less, for example, in a range of about 10 ppm to about 200 ppm, as measured by HF titration or using a HF concentration monitor.

Figure 2:
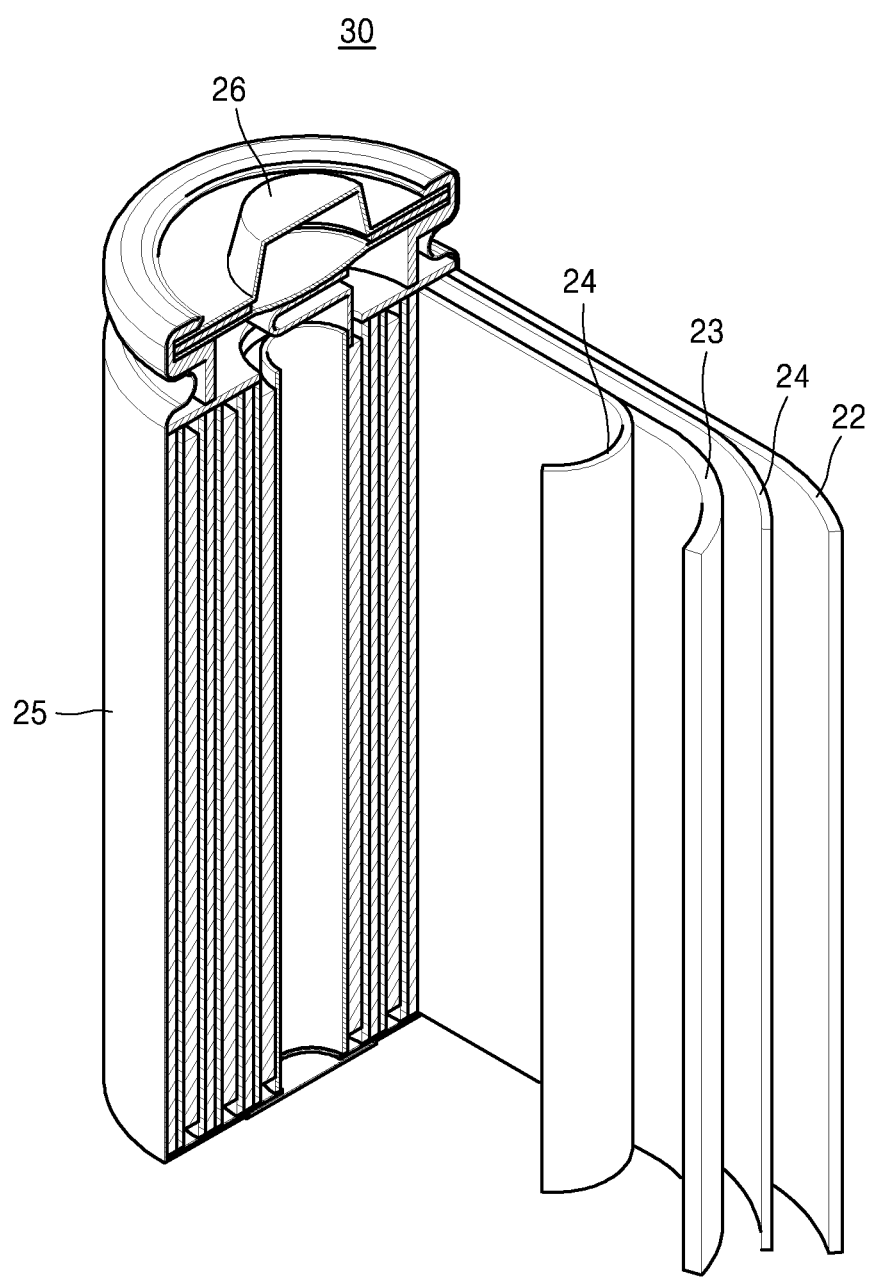
FIG. 2 is a schematic view of an embodiment of a lithium battery.

FIG. 2 is a schematic cross-sectional view illustrating a structure of a lithium battery 30 according to an embodiment of the present disclosure.

Referring to FIG. 2, the lithium battery 30 may include a cathode 23, an anode 22, a separator 24 between the cathode 23 and the anode 22, an electrolyte (not shown) according to any of the above-described embodiment that impregnates an electrode assembly including the cathode 23, the anode 22, and the separator 24 between the cathode 23 and the anode 22, a battery case 25, and a cap assembly 26 that seals the battery case 25. For example, the lithium battery 30 may be manufactured by sequentially stacking the cathode 23, the anode 22, and the separator 24 upon one another to form a stack, rolling the stack into a spiral form, and encasing the rolled up stack into the battery case 25. The battery case 25 may be sealed using the cap assembly 26, thereby completing the manufacture of the lithium battery 30.

Substituents in the formulae above may be defined as follows.

As used herein, the term "alkyl" indicates a completely saturated, branched or unbranched (or a straight or linear) hydrocarbon.

Non-limiting examples of the "alkyl" group include methyl, ethyl, n-propyl, isopropyl, n-butyl, isobutyl, sec-butyl, t-butyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group an amino group, an amidano group, a hydrazine group, a hydrazone group, a carboxyl group or a salt thereof, a sulfonyl group, a sulfamoyl group, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxyl group, a C6-C20 heteroaryloxyalkyl group, or a C6-C20 heteroarylalkyl group.

The term "halogen atom" indicates fluorine, bromine, chloride, or iodine.

The term "C1-C20 alkyl group substituted with a halogen atom" indicates a C1-C20 alkyl group substituted with at least one halogen atom. Non-limiting examples of the C1-C20 alkyl group substituted with a halogen atom include a polyhaloalkyl group including a monohaloalkyl group, a dihaloalkyl group, or a perhaloalkyl group.

A monohaloalkyl group indicates an alkyl group including one iodine, bromine, chlorine or fluorine. A dihaloalkyl group and a polyhaloalkyl group indicate alkyl groups including at least two identical or different halogen atoms.

As used herein, the term "alkoxy" represents "alkyl-O—", wherein the alkyl is the same as described above. Non-limiting examples of the alkoxy group include methoxy, ethoxy, propoxy, 2-propoxy, butoxy, t-butoxy, pentyloxy, hexyloxy, cyclopropoxy, and cyclohexyloxy. At least one hydrogen atom of the alkoxy group may be substituted with the same substituents as those recited above in conjunction with the alkyl group.

As used herein, the term "aryl" group, which is used alone or in combination, indicates an aromatic hydrocarbon containing at least one ring.

The term "aryl" is construed as including a group having an aromatic ring fused to at least one cycloalkyl ring.

Non-limiting examples of the "aryl" group include phenyl, naphthyl, and tetrahydronaphthyl.

At least one hydrogen atom of the "aryl" group may be substituted with substituents that are the same as those recited above in conjunction with the alkyl group.

The term "arylalkyl" indicates an alkyl group substituted with an aryl group. Examples of the "arylalkyl" group are benzyl and phenyl-$CH_2CH_2$—.

As used herein, the term "aryloxy" indicates "–O-aryl". An example of the aryloxy group is phenoxy. At least one hydrogen atom of the "aryloxy" group may be substituted with substituents that are the same as those recited above in conjunction with the alkyl group.

As used herein, the term "heteroaryl group" indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms.

At least one hydrogen atom of the heteroaryl group may be substituted with the same substituents as those recited above in conjunction with the alkyl group.

The term "heteroarylalkyl" group indicates an alkyl group substituted with a heteroaryl group.

The term "heteroaryloxy" group indicates a "—O-heteroaryl moiety". At least one hydrogen atom of the heteroaryloxy group may be substituted with the same substituents as those recited above in conjunction with the alkyl group.

The term "heteroaryloxyalkyl" group indicates an alkyl group substituted with a heteroaryloxy group. At least one hydrogen atom of the heteroaryloxyalkyl group may be substituted with the same substituents as those recited above in conjunction with the alkyl group.

As used herein, the term "carbocyclic" group indicates a saturated or partially unsaturated non-aromatic monocyclic, bicyclic or tricyclic hydrocarbon group.

Non-limiting examples of the monocyclic hydrocarbon group are a cyclopentyl group, a cyclopentenyl group, a cyclohexyl group, and a cyclohexenyl group. An example of the bicyclic hydrocarbon group is a decahydronaphthyl group.

An example of the tricyclic hydrocarbon group is an adamantyl group.

At least one hydrogen atom of the "carbocyclic group" may be substituted with substituents that are the same as those recited above in conjunction with the alkyl group.

As used herein, the term "heterocyclic group" indicates a five- to ten-membered ring including a heteroatom such as N, S, P, or O. An example of the heterocyclic group is pyridyl. At least one hydrogen atom in the heterocyclic group may be substituted with substituents that are the same as those recited above in conjunction with the alkyl group.

The term "heterocyclic oxy" indicates "—O-hetero ring". At least one hydrogen atom of the heterocyclic oxy group may be substituted with the same substituents as those recited above in conjunction with the alkyl group.

The term "sulfonyl" indicates R"—$SO_2$—, where R" is a hydrogen atom, an alkyl group, an aryl group, a heteroaryl group, an aryl-alkyl group, a heteroaryl-alkyl group, an alkoxy group, an aryloxy group, a cycloalkyl group, or a heterocyclic group.

The term "sulfamoyl" group refers to $H_2NS(O_2)$—, alkyl-$NHS(O_2)$—, $(alkyl)_2NS(O_2)$-aryl-$NHS(O_2)$—, alkyl-(aryl)-$NS(O_2)$—, $(aryl)_2NS(O)_2$, heteroaryl-$NHS(O_2)$—, (aryl-alkyl)-$NHS(O_2)$—, or (heteroaryl-alkyl)-$NHS(O_2)$—.

At least one hydrogen atom of the sulfamoyl group may be substituted with the same substituents as those described above in conjunction with the alkyl group.

The term "amino group" indicates a group with a nitrogen atom covalently bonded to at least one carbon or hetero atom. The amino group may refer to, for example, —$NH_2$ and substituted moieties.

The term "amino group" also refers to an "alkylamino group" with nitrogen bound to at least one additional alkyl group, and "arylamino" and "diarylamino" groups with at least one or two nitrogen atoms bound to a selected aryl group.

"Transition metal" as defined herein refers to an element of Groups 3 to 11 of the Periodic Table of the Elements.

An embodiment will now be described in further detail with reference to the following examples. However, these examples are only for illustrative purposes and shall not limit the scope of the disclosure.

EXAMPLES

Example 1

Preparation of Electrolyte (N,O-bis(trimethylsilyl)hydroxylamine (THA) as a compound represented by Formula 4 was added to a nonaqueous organic solvent including 70 percent by volume (vol %) of fluoroethylene carbonate (FEC) and 30 vol % of dimethylcarbonate (DMC), and a $LiPF_6$ as a lithium salt was added thereto to obtain a 1.3 M $LiPF_6$ solution as an electrolyte. An amount of THA was about 2 wt % based on based on a total weight of the electrolyte.

Example 2

Preparation of Electrolyte

An electrolyte was prepared in substantially the same manner as in Example 1, except that 1,1,3,3,5,5-hexamethyltrisiloxane (HTS) as a compound represented by Formula 5 was used instead of THA. An amount of HTS in the electrolyte was about 2 wt % based on a total weight of the electrolyte.

Example 3

Preparation of Electrolyte

An electrolyte was prepared in substantially the same manner as in Example 1, except that lithium trimethylsilanolate (LTS) as a compound represented by Formula 6 was used instead of THA. An amount of LTS in the electrolyte was about 2 wt % based on a total weight of the electrolyte.

Example 4

Preparation of Electrolyte

An electrolyte was prepared in substantially the same manner as in Example 1, except that 0.1 wt % of THA was used instead of 2 wt % of THA. The amount of THA in the electrolyte was about 0.1 wt % based on a total weight of the electrolyte.

Example 5

Preparation of Electrolyte

An electrolyte was prepared in substantially the same manner as in Example 1, except that 0.1 wt % of HTS was used instead of 2 wt % of THA. The amount of HTS in the electrolyte was about 0.1 wt % based on a total weight of the electrolyte.

Example 6

Preparation of Electrolyte

An electrolyte was prepared in substantially the same manner as in Example 1, except that 0.1 wt % of LTS was used instead of 2 wt % of THA. The amount of LTS in the electrolyte was about 0.1 wt % based on a total weight of the electrolyte.

Example 7

Preparation of Electrolyte

An electrolyte was prepared in substantially the same manner as in Example 1, except that 0.005 wt % of THA was used instead of 2 wt % of THA. The amount of THA in the electrolyte was about 0.005 wt % based on a total weight of the electrolyte.

Example 8

Preparation of Electrolyte

An electrolyte was prepared in substantially the same manner as in Example 1, except that 10 wt % of THA was used instead of 2 wt % of THA. The amount of THA in the electrolyte was about 10 wt % based on a total weight of the electrolyte.

Comparative Example 1

Preparation of Electrolyte

An electrolyte was prepared in substantially the same manner as in Example 1, except that THA was not used.

Comparative Example 2

Preparation of Electrolyte

An electrolyte was prepared in substantially the same manner as in Example 1, except that hexamethyldisilazane (NHS) as a compound represented by Formula 6 was used instead of THA.

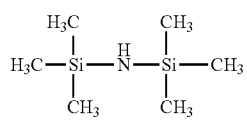

Formula 6

Comparative Example 3

Preparation of Electrolyte

An electrolyte was prepared in substantially the same manner as in Example 1, except that lithium hexamethyldisilazane (LHS) as a compound represented by Formula 7 was used instead of THA.

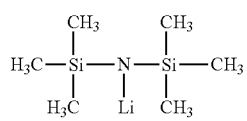

Formula 7

Comparative Example 4

Preparation of Electrolyte

An electrolyte was prepared in substantially the same manner as in Comparative Example 2, except that an amount of NHS was changed from about 2 wt % to about 0.1 wt %.

Comparative Example 5

Preparation of Electrolyte

An electrolyte was prepared in substantially the same manner as in Comparative Example 3, except that an amount of LHS was changed from about 2 wt % to about 0.1 wt %.

Manufacture Example 1

Manufacture of Coin Cell $Li_{1.17}Ni_{0.17}Co_{0.17}Mn_{0.5}O_2$ as a cathode active material, a polyvinylidene fluoride (PVDF) as a binder, and Denka black as a conducting agent were mixed in a weight ratio of 90:5:5, and then dispersed in N-methyl-2-pyrrolidone to prepare a cathode active material layer composition. The cathode active material layer composition was coated on an aluminum foil having a thickness of 15 μm. The aluminum foil coated with the cathode active material layer composition was dried in a 90° C. oven for about 2 hours (first drying), and then in a 120° C. vacuum oven for about 2 hours (second drying) until the solvent was completely evaporated, followed by rolling and punching to obtain a cathode.

The cathode, a graphite anode (ICG10H, available from Mitsubishi), a polyethylene separator (Celgard 3501, available from Celgard), and the electrolyte of Example 1 were used to manufacture a 2032-standard coin cell.

Manufacture Examples 2-8

Manufacture of Coin Cells

Coin cells were manufactured in substantially the same manner as in Manufacture Example 1, except that the electrolytes of Examples 2 to 8 were used, respectively, instead of the electrolyte of Example 1.

Comparative Manufacture Examples 1-5

Manufacture of Coin Cells

Coin cells were manufactured in substantially the same manner as in Manufacture Example 1, except that the electrolytes of Comparative Examples 2 to 5 were used, respectively, instead of the electrolyte of Example 1.

Evaluation Example 1

Evaluation of Specific Capacity and Capacity Retention Rate

A charge/discharge test was performed on the coin cells of Manufacture Examples 1 to 8 and Comparative Manufacture Examples 1 to 5 as follows.

First, a formation process and charging/discharging process were performed on the coin cells of Manufacture Examples 1 to 8 and Comparative Manufacture Examples 1 to 5 at room temperature.

Manufacture Examples 1 to 3 and Comparative Manufacture Examples 1 to 3

The coin cells of Manufacture Examples 1 to 3 and Comparative Manufacture Examples 1 to 3 were each charged with a constant current of 0.1 Coulomb (C) rate at about 25 C to a voltage of about 4.25 V, followed by discharging with a constant current of 0.1 C to a voltage of about 2.5 V (formation process, $1^{st}$ cycle).

Subsequently, each of the coin cells was charged with a constant current of 0.5 C rate at about 25° C. to a voltage of about 4.55 V, followed by discharging with a constant current of 0.2 C to a voltage of about 2.5 V (formation process, $2^{nd}$ cycle).

The term "1 C charging" refers to charging for 1 hour to reach the capacity of a battery in milliampere-hours (mAh). Likewise, the term "1 C discharging" refers to discharging for 1 hour to fully discharge the capacity of the battery in mAh.

Subsequently, each of the coin cells after the formation process was charged with a constant current of 1 C rate at about 25° C. to a voltage of about 4.55 V, followed by discharging with a constant current of 1 C to a voltage of about 2.5 V to measure a discharge capacity, which was determined as a $1^{st}$-cycle discharge capacity or an initial capacity. This charge and discharge cycle was repeated to the $300^{th}$ cycle.

Figure 3:
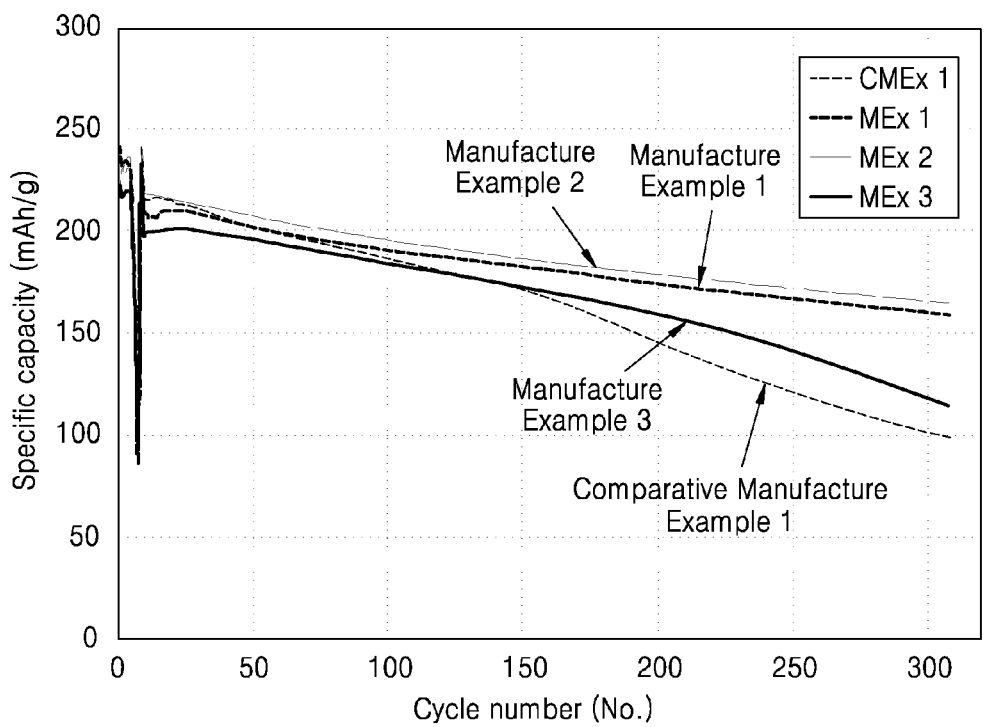
FIG. 3 is a graph of specific capacity (milliampere-hours per gram, mAh/g) versus cycle number (No.) illustrating specific capacity characteristics of coin cells of Manufacture Examples ("MEx") 1 to 3 and Comparative Manufacture Example ("CMEx") 1.

The discharge capacity measured after each charge and discharge cycle was termed as a specific capacity. The results are shown in FIG. 3. FIG. 3A is a graph illustrating specific capacity characteristics of the coin cells of Manufacture Examples 1 to 3 and Comparative Manufacture Example 1.

Capacity retention rates of the coin cells of Manufacture Examples 1 to 3 and Comparative Manufacture Example 1 were calculated based on the discharge capacities at the charge and discharge cycles, using Equation 1. The results are shown in FIG. 4.

Capacity Retention Rate (%)=(Discharge capacity at $300^{th}$ cycle/Discharge cycles at $1^{st}$ cycle)×100      Equation 1

Figure 4:
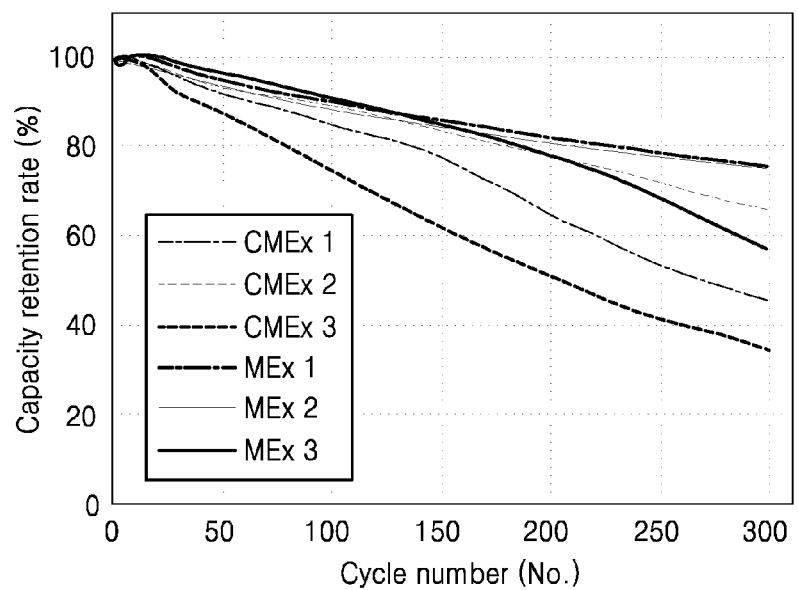
FIG. 4 is a graph specific capacity (milliampere-hours per gram, mAh/g) versus cycle number (No.) illustrating showing capacity retention rate characteristics of the coin cells of Manufacture Examples 1 to 3 and Comparative Manufacture Examples 1 to 3.

In FIG. 4, the capacity retention rate of the coin cells of Comparative Manufacture Examples 1 to 3 and Manufacture Examples 1 to 3, respectively, is shown.

The capacity retention rates of the coin cells of Manufacture Examples 1 and 2 and Comparative Manufacture Examples 1 and 3 at the $300^{th}$ cycle are shown in Table 3.

TABLE 1

| Example | Capacity retention rate (%, @ $300^{th}$ cycle) |
|---|---|
| Manufacture Example 1 | 75.9 |
| Manufacture Example 2 | 75.3 |
| Comparative Manufacture Example 1 | 46.1 |
| Comparative Manufacture Example 3 | 34.9 |

Referring to FIG. 4 and Table 1, the coin cells of Manufacture Examples 1 and 2 are found to have improved capacity retention rates and improved lifetimes, compared to the coin cell of Comparative Manufacture Examples 1 and 3.

Manufacture Examples 4 to 6 and Comparative Manufacture Examples 1, 4, and 5

Figure 5:
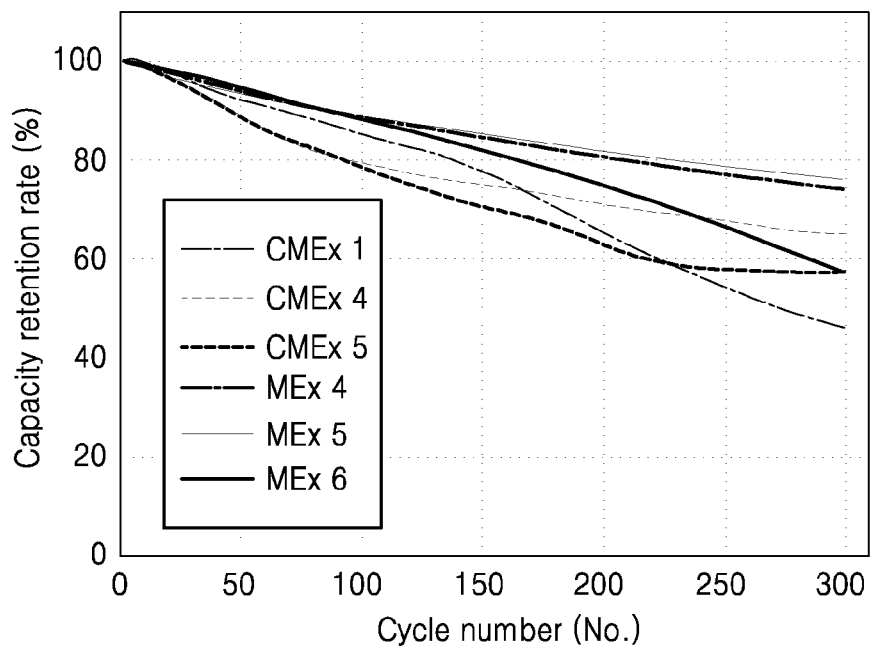
FIG. 5 is a graph of capacity retention rate (percent, %) versus cycle number (No.) showing capacity retention rate characteristics of coin cells of Manufacture Examples ("MEx") 4 to 6 and Comparative Manufacture Examples ("CMEx") 1, 4, and 5.

A charge/discharge test was performed on the coin cells of Manufacture Examples 4 and 6 and Comparative Manufacture Example 1, 4, and 5 in the same manner as performed above on the coin cells of Manufacture Examples 1 to 3 and Comparative Manufacture Examples 1 to 3 to evaluate capacity retention rates thereof. The results are shown in FIG. 5. In FIG. 5, the capacity retention rate of the coin cells of Comparative Manufacture Examples 1, 4 and 5 and Manufacture Examples 4 to 6, respectively, is shown.

Referring to FIG. 5, the coin cells of Manufacture Examples 4-6 have improved capacity retention rates, compared to the coin cells of Comparative Manufacture Examples 1, 4, and 5.

Evaluation Example 2

Average Charging and Discharging Efficiency

After performing the charge/discharge cycles 300 times on the coin cells of Manufacture Examples 1 to 3 and Comparative Manufacture Examples 1 to 3 according to Evaluation Example 1, average charging and discharging efficiencies thereof were calculated. The results are shown in FIG. 6.

Figure 6:
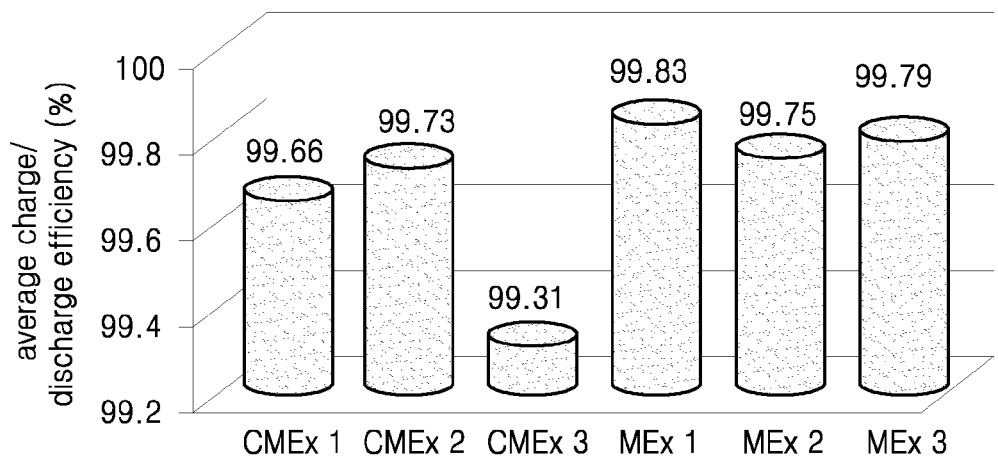
FIG. 6 is a graph of average charge/discharge efficiencies (percent, %) of the coin cells of Manufacture Examples 1 to 3 and Comparative Manufacture Examples 1 to 3.

Referring to FIG. 6, the coin cells of Manufacture Examples 1 to 3 are found to have improved average charging and discharging efficiencies, compared to the coin cells of Comparative Manufacture Examples 1 to 3.

Evaluation Example 3

Average Discharge Voltage

A discharge voltage variation ($\Delta V$) with respect to the $1^{st}$ cycle discharge voltage of each of the coin cells of Manufacture Examples 1 to 3 and Comparative Manufacture Examples 1 to 3 was calculated based on the discharge voltages of the coin cells at each cycle of the charge/discharge test according to Evaluation Example 1. An average discharge voltage (Avg) of each of the coin cells was calculated as a median of the discharge voltage at each cycle.

Figure 7:
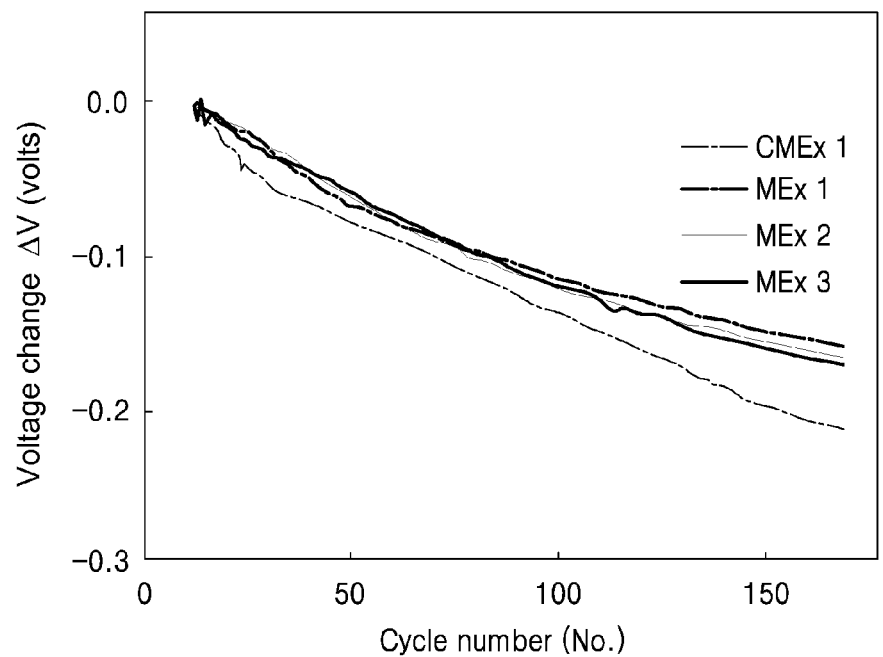
FIG. 7 is a graph of voltage change ($\Delta V$, volts) versus cycle number (No.) showing discharge voltage variations of the coin cells of Manufacture Examples 1 to 3 and Comparative Manufacture Example 1.
Figure 8:
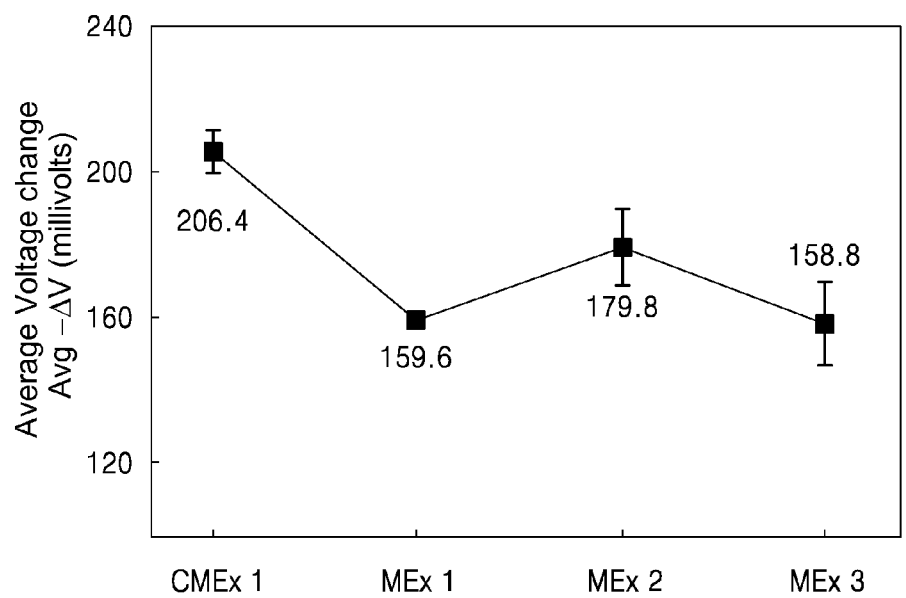
FIG. 8 is a graph of average voltage change (Avg $\Delta V$, millivolts (mV)) versus cycle number (No.) showing average discharge voltage variation of the coin cells of Manufacture Examples 1 to 3 and Comparative Manufacture Example 1.

The discharge voltage variations and the average discharge voltage variations are shown in FIGS. 7 and 8, respectively. In FIG. 7, the voltage change of the coin cells of Comparative Manufacture Example ("CMEx") 1 and Manufacture Examples ("MEx") 1 to 3, respectively. In FIG. 8, the average voltage change of the coin cells of Comparative Manufacture Example 1 and Manufacture Examples 1 to 3, respectively.

Referring to FIG. 7, the coin cells of Manufacture Examples 1 to 3 were found to have less discharge voltage variations, compared to the coin cells of Comparative Manufacture Example 1. Referring to FIG. 8, the coin cells of Manufacture Examples 1 to 3 were found to have less average discharge voltage variations.

Evaluation Example 4

Initial Capacity and High-Rate Characteristics

Manufacture Examples 1-3 and Comparative Manufacture Examples 1 and 3

The coin cells of Manufacture Examples 1 to 3 and Comparative Manufacture Examples 1 and 3 were each charged with a constant current of 0.1 C and a constant voltage of 4.55 V (0.05 C cut-off). After a rest for about 10 minutes, each coin cell was discharged with a current of 0.2 C or 1 C to a voltage of about 2.5 V to measure an initial capacity. This charging and discharging cycle was repeated to the $300^{th}$ cycle High-rate discharge characteristics (rate capabilities of the coin cells were evaluated. The results are shown in Table 2.

TABLE 2

| Example | Initial capacity (0.2 C) | High-rate characteristics (0.2 C/1.0 C) |
|---|---|---|
| Manufacture Example 1 | 234 | 86.8 |
| Manufacture Example 2 | 237 | 88.0 |
| Manufacture Example 3 | — | 72.9 |
| Comparative Manufacture Example 1 | 231 | 64.2 |
| Comparative Manufacture Example 3 | 232 | 45.1 |

Referring to Table 2, the coin cells of Manufacture Examples 1 to 3 are found to have improved high-rate characteristics, compared to the coin cells of Comparative Manufacture Examples 1 and 3.

Referring to Table 2, the coin cells of Manufacture Examples 1 to 3 are found to have improved high-rate characteristics, compared to the coin cells of Comparative Manufacture Examples 1 and 3.

Evaluation Example 5

Impedance Measurement

Figure 9:
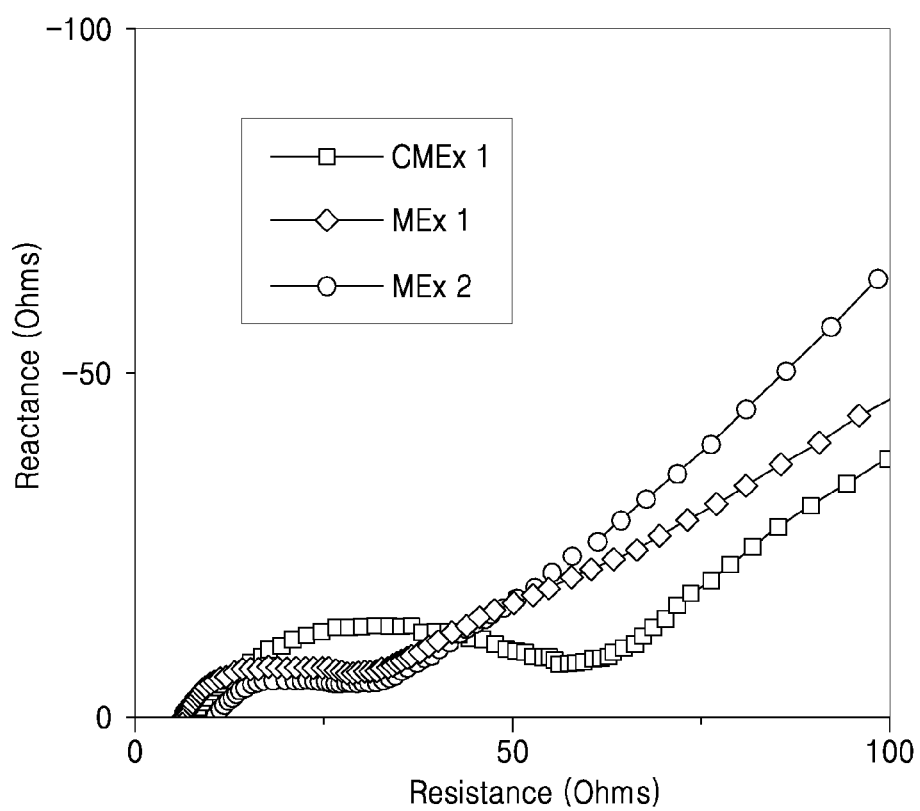
FIG. 9 is a graph of resistance (Z', ohms) versus reactance (Z", ohms) showing impedances of the coin cells of Manufacture Examples 1 and 2 and Comparative Manufacture Example 1.

Impedances of the coin cells of Manufacture Examples 1 and 2 and Comparative Manufacture Example 1 were measured. The results are shown in FIG. 9. In FIG. 9, Z' and Z" are represented in 0. In FIG. 9, the complex impedance of the coin cells of Comparative Manufacture Example 1 and Manufacture Examples 1 and 2, respectively, is shown.

Referring to FIG. 9, the coin cells of Manufacture Examples 1 and 2 are found to have lower resistances than the coin cell of the Comparative Manufacture Example 1, indicating that solid electrolyte interface (SEI) damage was suppressed in the coin cells of Manufacture Examples 1 and 2 even after the 300$^{th}$ cycle, so that an increase in resistance resulting from SEI damage was prevented.

As described above, according to the one or more of the above embodiments of the present disclosure, an electrolyte for a lithium battery may include a compound of Formula 1 above, a nonaqueous organic solvent, and a lithium salt. A lithium battery including the electrolyte may have improved lifetime characteristics, improved high-rate characteristics, and improved average discharge voltage characteristics.

It should be understood that the exemplary embodiments described herein shall be considered in a descriptive sense only and not for purposes of limitation. Descriptions of features, advantages, or aspects within each embodiment should typically be considered as available for other similar features, advantages, or aspects in other embodiments.

What is claimed is:

1. An electrolyte for a lithium battery, the electrolyte comprising:
a compound represented by Formula 2 or a compound represented by Formula 3;
a nonaqueous organic solvent; and
a lithium salt:

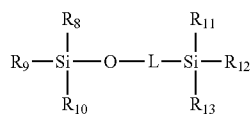

Formula 2 wherein, in Formula 2,
L is —N(H)— or —Si($R_3$)($R_4$)—O—, and
$R_3$, $R_4$, and $R_8$ to $R_{13}$ are each independently a C1-C30 alkyl group or a C6-C30 aryl group, wherein $R_9$ and $R_{12}$ hydrogen when L is —Si($R_3$)($R_4$)—O—;

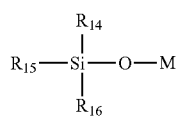

Formula 3 wherein, in Formula 3,
$R_{14}$ to $R_{16}$ are each independently a C1-C30 alkyl group or a C6-C30 aryl group, and
M is Li, Na, or K.

2. The electrolyte of claim 1, wherein,
in Formula 2, $R_3$, $R_4$, and $R_8$ to $R_{13}$ are each independently a C1-C10 alkyl group, and
in Formula 3, M is Li and $R_{14}$ to $R_{16}$ are each independently a C1-C10 alkyl group.

3. The electrolyte of claim 1, wherein the compound represented by Formula 2 is a compound represented by Formula 4 or a compound represented by Formula 5, and wherein the compound represented by Formula 3 is a compound represented by Formula 6:

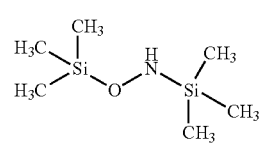

Formula 4

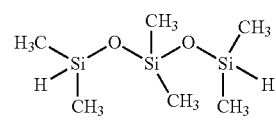

Formula 5

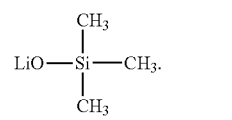

Formula 6

4. The electrolyte of claim 1, wherein an amount of the compound represented by Formula 2 or the compound represented by Formula 3 is in a range of about 0.005 weight percent to about 10 weight percent, based on a total weight of the electrolyte.

5. The electrolyte of claim 1, wherein an amount of the compound represented by Formula 2 or the compound represented by Formula 3 is in a range of about 0.1 weight percent to about 2 weight percent, based on a total weight of the electrolyte.

6. The electrolyte of claim 1, wherein the lithium salt is capable of generating hydrogen fluoride.

7. The electrolyte of claim 6, wherein the lithium salt capable of generating hydrogen fluoride is at least one selected from $LiPF_6$, $LiBF_4$, $LiAsF_6$, $LiCF_3SO_3$, $Li(CF_3SO_2)_2N$, $LiC_4F_9SO_3$, and $Li(CF_3SO_2)_3C$.

8. The electrolyte of claim 6, wherein the lithium salt further comprises at least one selected from $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, and $LiB(C_2O_4)_2$.

9. The electrolyte of claim 1, wherein the nonaqueous organic solvent comprises at least one selected from a carbonate solvent, an ester solvent, an ether solvent, a ketone solvent, and an alcohol solvent, and an aprotic solvent.

10. The electrolyte of claim 1, wherein the nonaqueous organic solvent is at least one selected from dimethyl carbonate, diethyl carbonate, dipropyl carbonate, methyl propyl carbonate, ethyl propyl carbonate, methyl ethyl carbonate, ethylene carbonate, propylene carbonate, butylene carbonate, fluoroethylene carbonate, vinylene carbonate, acetonitrile, succinonitrile, dimethyl sulfoxide, dimethyl formamide, dimethyl acetamide, γ-butyrolactone, and tetrahydrofuran.

11. The electrolyte of claim 1, wherein a concentration of the lithium salt is in a range of about 0.1 mole per liter to about 2.0 moles per liter.

12. The electrolyte of claim 1, wherein the nonaqueous organic solvent comprises a cyclic carbonate and an acyclic carbonate.

13. The electrolyte of claim 1, wherein the nonaqueous organic solvent comprises a fluoroethylene carbonate and dimethyl carbonate.

14. A lithium battery comprising:
a cathode;
an anode;
the electrolyte of claim 1; and
a reaction product of the electrolyte.

15. The lithium battery of claim 14, wherein the cathode comprises at least one cathode active material selected from $LiCoO_2$, $LiNi_{1-x}Co_xO_2$ wherein $0 \leq x<1$, $Li_{1-x}M^a{}_xO_2$ wherein $M^a$ is at least one selected from Mn and Fe, and $0.03<x<0.1$, $Li[Ni_xCo_{1-2x}Mn_x]O_2$ wherein $0<x<0.5$, $Li[Ni_xMn_x]O_2$ wherein $0<x\leq 0.5$, $Li_{1+x}(Ni, Co, Mn)_{1-y}O_z$ wherein $0<x\leq 1$, $0\leq y<1$, and $2\leq z\leq 4$, $LiM^b{}_2O_4$ wherein $M^b$ is at least one selected from Ti, V, and Mn, $LiM^c{}_xMn_{2-x}O_4$ wherein $M^c$ is a transition metal and $0\leq x<2$, $LiFePO_4$, $LiM^dPO_4$ wherein $M^d$ is at least one selected from Mn, Co, and Ni, $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta\text{-}Mn_yV_2O_5$, $\delta\text{-}NH_4V_4O_{10}$, $Mn_{0.8}V_7O_{16}$, $LiV_3O_8$, $Cu_xV_2O_5$, $Cr_xV_6O_{13}$, $M^e{}_2(XO_4)_3$ wherein $M^e$ is a transition metal, and X is at least one selected from S, P, As, Mo, and W, and $Li_3M^f{}_2(PO_4)_3$ where $M^f$ is at least one selected from Fe, V, and Ti.

16. The lithium battery of claim 15, wherein the cathode active material is $Li_{1+x}Mn_wCo_yNi_zO_2$ (wherein $w+x+y+z=1$, $0.05\leq x\leq 0.2$, $0.05\leq w<1$, $0.05\leq y<1$, and $0.05\leq z<1$).

17. The lithium battery of claim 14, wherein the anode comprises at least one anode active material selected from a vanadium oxide, a lithium vanadium oxide, Si, $SiO_x$ wherein $0<x<2$, graphite, soft carbon, hard carbon, mesophase pitch carbide, and sintered coke, and an alloy of the formula a Si-$M^j$ wherein $M^j$ is at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

18. The lithium battery of claim 14, wherein the anode comprises a solid electrolyte interface on a surface thereof, and wherein the solid electrolyte interface comprises the compound represented by Formula 1:

Formula 1 wherein, in Formula 1,
X is hydrogen or a C1-C30 alkyl group,
$Y^a$ is Si or Ge,
Z is —O—N(R)—$Z_1$, —O-M, or —O—Si($R_3$)($R_4$)—$Z_2$, wherein M is an alkali metal, R is hydrogen, lithium, or a C1-C30 alkyl group, a C4-C30 carbocyclic group, or a C5-C30 carbocyclic alkyl group, and $Z_1$ and $Z_2$ are each independently hydrogen, a C1-C30 alkyl group, a C4-C30 carbocyclic group, a C5-C30 carbocyclic alkyl group, —Si($R_5$)($R_6$)($R_7$), or —O—Si($R_5$)($R_6$)($R_7$), and $R_1$ to $R_7$ are each independently hydrogen, a C1-C30 alkyl group, a C1-C30 alkoxy group, a C6-C30 aryl group, a C6-C30 aryloxy group, a C7-C30 arylalkyl group, a C2-C30 heteroaryl group, a C2-C30 heteroaryloxy group, a C3-C30 heteroarylalkyl group, a C4-C30 carbocyclic group, a C5-C30 carbocyclic alkyl group, a C2-C30 heterocyclic group, a C3-C30 heterocyclic alkyl group, a halogen atom, a hydroxy group, a cyano group, or an amino group.

* * * * *